Figure 1:
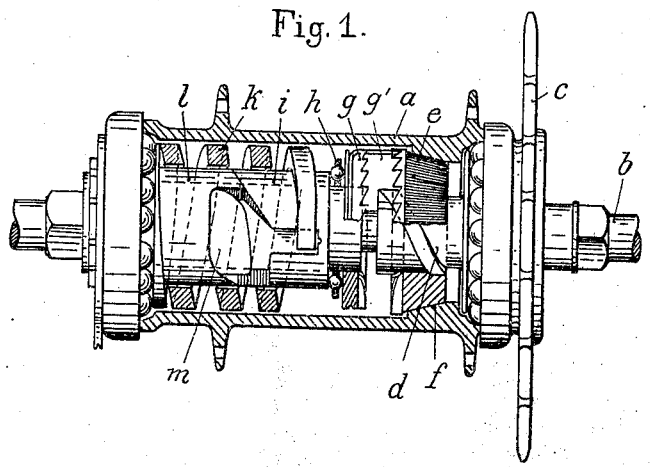

Feb. 23, 1926.

J. SCHALL 1,574,173

FREE WHEEL HUB

Filed July 28, 1925

2 Sheets-Sheet 1

Inventor
J. Schall
By Marks + Clerk
attys

Feb. 23, 1926.

J. SCHALL 1,574,173

FREE WHEEL HUB

Filed July 28, 1925

2 Sheets-Sheet 2

Patented Feb. 23, 1926.

1,574,173

UNITED STATES PATENT OFFICE.

JOSEF SCHALL, OF BERLIN-NEUKOLLN, GERMANY, ASSIGNOR TO BERLIN-KARLS-RUHER INDUSTRIE-WERKE A. G., OF BERLIN, GERMANY.

FREE-WHEEL HUB.

Application filed July 28, 1925. Serial No. 46,680.

*To all whom it may concern:*

Be it known that I, JOSEF SCHALL, a citizen of the German Republic, and residing at 8 Ossastrasse, Berlin-Neukolln, Germany, have invented certain new and useful Improvements in Free-Wheel Hubs, of which the following is a specification.

This invention relates to a free-wheel hub with a back-pedalling brake, in which a helical spring acts as the brake member. In the free-wheel hubs of this type as hitherto made the helical brake spring is stressed either by being compressed axially or by being unwound by the backwardly turned chain wheel or by both these means and thereby caused to bear against the sleeve of the hub, to which the braking action is to be applied. The unwinding or rolling up of the helical spring is effected in opposition to the direction of rotation of the hub to be braked, so that the latter, on coming in contact with the spring, acts in opposition to the unwinding or rolling up, whereby both the braking action is diminished and a considerable expenditure of force becomes necessary.

It has already been proposed to overcome this drawback of the free-wheel hubs with a helical braking spring as hitherto known by superposing over the band spring which is unwound during back-pedalling a second oppositely wound band spring, which is caused by the inner spring which spreads during back-pedalling to bear on the hub sleeve which is to be braked and is rolled up still further by the same. Such hubs have the disadvantage of being complicated in their construction.

The invention presents a new solution of the problem of converting the rotary motion of the cranks or of the chain wheel, which is backwardly directed when braking, into a forward unwinding motion of the helical braking spring, i. e., a motion in the direction of rotation of the hub, without having the disadvantages of the suggestion previously referred to.

This new solution of the problem consists in this, that with the helical spring, which in a known manner is fixed at one end and the other end of which is attached to a guiding sleeve which is capable of being slid by the coupling cone, the said guiding sleeve is displaced by the action of back-pedalling by the coupling cone along the inclined surfaces of a cam and is turned in such a manner as to unwind the braking spring in the direction of rotation of the hub. Thus the braking spring is both unwound in a known manner and compressed axially. The free-wheel hub according to the present invention differs from those, in which the braking spring is unwound and compressed at the same time, by the direction, in which the unwinding takes place. In contradistinction to the known proposal to unwind the braking spring in the direction of rotation of the hub the construction of the hub according to the invention is simpler owing to the fact that only a single spring is used. While a brake making use of a single spring which is unwound in the same manner when braking is also not new, in this older construction the spring is tensioned by a pulling device acting on the free end of the spring, which is operated by hand.

In order to reduce as far as possible the work to be performed in applying the brake, in a modified form of the invention the axial compression of the helical braking spring is done away with by the slot in the guiding sleeve, in which the helical braking spring engages with one bent over end, being so shaped that the sleeve during its displacement and rotation can exert no pressure on the braking spring in the axial direction. The tension due to the unwinding of the spring is alone sufficient radially to release the spring from the hub on commencing to pedal forward again.

Figure 2:
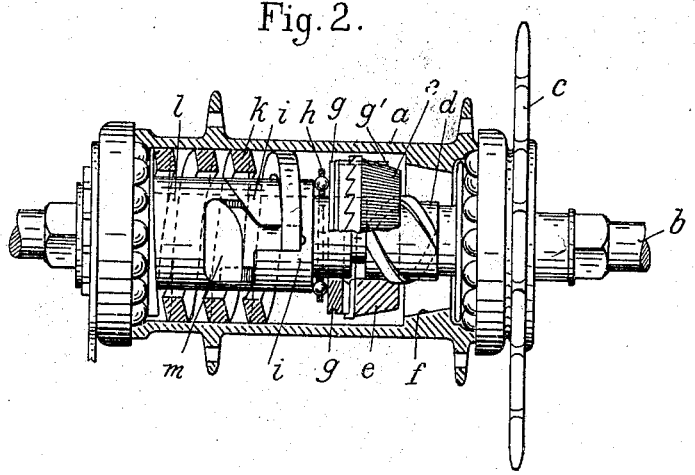
Figure 3:
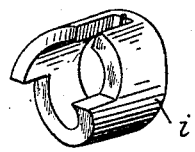
Figure 4:
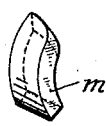
Figure 5:
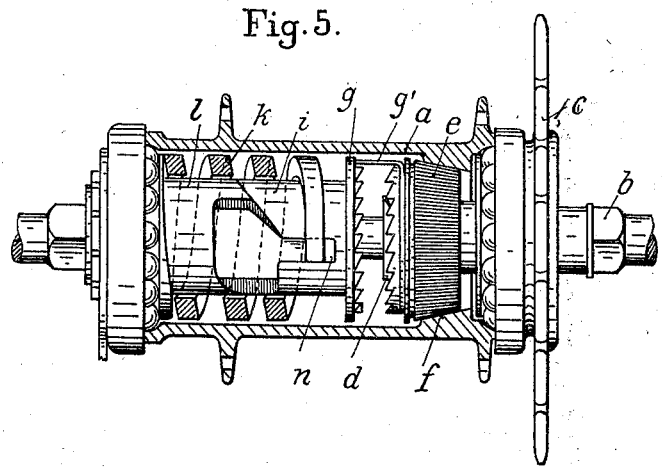
Figure 6:
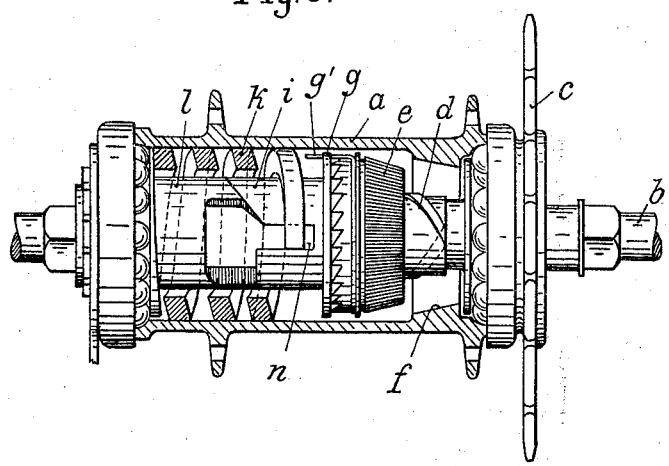

The accompanying drawings represent two constructional forms of the hub according to the invention, Fig. 1 being an axial section through one constructional form with the parts in the driving position, Fig. 2 with the parts in the braking position, Figs. 3 and 4 details of the same and Figs. 5 and 6 an axial section through a second constructional form of the hub with the parts in the driving and braking positions respectively.

The hub $a$ is rotatable on the fixed axle $b$ and is driven from the chain wheel $c$. The latter is rigidly connected to the so-called driving member $d$, on which the coupling cone $e$ is axially slidable by means of the thread indicated in the drawing. When pedalling forward the coupling cone $e$ is drawn against a correspondingly conical coupling face $f$ on the hub $a$, so that, as shown in Fig. 1, the chain wheel $c$ is coupled to the hub $a$, the hub and consequently the bicycle being driven forward.

On the axle $b$ is mounted so as not to rotate thereon but to be slidable in the axial direction the movable member $g$ of a ratchet clutch, in the teeth of which corresponding teeth on the coupling cone $e$ engage, when back-pedalling. A small spring $g^1$ on the member $g$ slides on the coupling cone $e$ or engages in a notch therein, for preventing the cone $e$ rotating with the driving member $d$.

The toothed member $g$ presses by means of a disc $h$ with balls or directly against a sleeve $i$ in the slot $n$ of which the helical braking spring $k$ engages with its free end, which is bent round like a hook. The sleeve $i$ (Fig. 3) is provided at its other end with cam surfaces, with which it is capable of sliding and turning against a non-rotatable guiding piece $l$ provided with corresponding cam surfaces.

On back-pedalling, the coupling cone $e$ presses by means of the toothed member $g$ and the disc $h$ against the sleeve $i$, so that the latter will be displaced to the left along the cam surfaces of the guiding piece $l$ (Fig. 1), being given a rotary motion at the same time. By this means the spring $k$ is unwound and at the same time compressed and is caused to bear first with its outermost convolutions against the hub, which through friction will carry the spring along with it and unwind it still further. Hence, for braking, it is only necessary when back-pedalling to expend sufficient force to cause the spring to bear to some extent, for instance with its first convolutions, against the hub, the actual braking action being thereupon performed by the hub itself.

In order to limit the path along which the brake is to be moved, it is usual to provide stop members. In the present instance a suitably curved small block $m$ can be applied to the cam of the guiding member $l$. By this means it is possible, so as to allow for the gradual wear of the various parts of the brake, by taking out, grinding and replacing the block $m$ gradually to lengthen the path along which the brake is to be moved.

The position of the parts of the hub for free-wheeling will be clear by referring to the drawing. The release of the brake is effected, on the backward pressure on the cranks ceasing, through the tensioned and compressed spring becoming unstressed and thereby releasing the hub.

In the constructional form shown in Figs. 5 and 6, the disc $h$ with its balls is omitted and the spring $g^1$ is fixed not to the toothed member $g$, but to the coupling cone $e$, so that its bent over end engages in a notch in the toothed member $g$. These variants are of course of no importance. What is essential, however, is, that the slot $n$ of the guiding sleeve $i$, in which the free end of the helical braking spring engages, shall be so formed or extended that the braking spring $k$ can not rest against the end of the slot $n$, when the guiding sleeve $i$ is displaced. Hence, it is impossible that the guiding sleeve $i$, on being turned and slid can exert a pressure on the braking spring $k$ in the axial direction and the braking spring $k$ will thus not be axially compressed. By this means the work to be performed by the rider, when applying the brake, is reduced, with the further effect that the braking action is far more gentle than has been the case hitherto.

What I claim is:—

1. A free-wheel hub and back-pedalling mechanism, comprising in combination a fixed axle, a hub rotatable thereon, a sleeve within the hub, capable of axial and rotary motion relative to the axle, a coupling member within the hub slidable relatively to the axle, inclined cam surfaces on the sleeve and corresponding cam surfaces on the axle and a helical braking spring within the hub capable of being unwound by bearing against the forwardly running hub, the helical spring having one end fixed to a stationary part of the hub mechanism and the other end in engagement with the said sleeve, whereby, on back-pedalling taking place, the sleeve is axially displaced and turned along the inclined surfaces on the axle, so as to unwind the braking spring in the direction of rotation of the hub, as and for the purpose set forth.

2. A free-wheel hub and back-pedalling mechanism, comprising in combination a fixed axle, a hub rotatable thereon, a sleeve within the hub, capable of axial and rotary motion relative to the axle, a slot in the said sleeve, a coupling member within the hub slidable relatively to the axle, inclined cam surfaces on the sleeve and corresponding cam surfaces on the axle and a helical braking spring within the hub capable of being unwound by bearing against the forwardly running hub, the helical spring having one end fixed to a stationary part of the hub mechanism and having its hook-shaped other end in engagement with the slot in the sleeve, whereby, on back-pedalling taking place, the sleeve is axially displaced and turned along the inclined surfaces on the axle, so as to unwind the braking spring in the direction of rotation of the hub, the slot being so shaped that the sleeve, on being displaced can exert no axial pressure on the braking spring, as and for the purpose set forth.

In testimony whereof I have signed my name to this specification.

JOSEF SCHALL.